(12) United States Patent
Kremer et al.

(10) Patent No.: US 9,581,292 B2
(45) Date of Patent: Feb. 28, 2017

(54) MAGNETIC SURFACE MOUNTING APPARATUS

(71) Applicant: HANG EM UP INC., Mackay, ID (US)

(72) Inventors: Tyrell J. Kremer, Wilton, CA (US); Jason C. Lindstrom, Reno, NV (US); Richard A. Seifert, Livermore, CA (US); Nathan R Seifert, Livermore, CA (US)

(73) Assignee: Hang Em up Inc., Mackay ( * ) Notice: Subject to any disclaimer, the term of this patent is extended or adjusted under 35 U.S.C. 154(b) by 0 days.

(21) Appl. No.: 15/160,023

(22) Filed: May 20, 2016

(65) Prior Publication Data

US 2016/0369944 A1 Dec. 22, 2016

Related U.S. Application Data

(63) Continuation of application No. 29/561,532, filed on Apr. 17, 2016, which is a continuation of application No. 29/561,636, filed on Apr. 18, 2016.

(60) Provisional application No. 62/180,930, filed on Jun. 17, 2015.

(51) Int. Cl.
*F16M 13/02* (2006.01)
*G09F 13/20* (2006.01)
*F16B 1/00* (2006.01)

(52) U.S. Cl.
CPC ............ *F16M 13/022* (2013.01); *G09F 13/20* (2013.01); *F16B 2001/0035* (2013.01)

(58) Field of Classification Search
CPC .................. F16M 13/022; F16B 2001/0035
See application file for complete search history.

(56) References Cited

U.S. PATENT DOCUMENTS

| | | | | |
|---|---|---|---|---|
| 2011/0140474 A1* | 6/2011 | Smith | ................ | B60R 13/0206 296/35.1 |
| 2012/0097813 A1* | 4/2012 | Li | ................ | F16B 47/006 248/220.22 |
| 2013/0277510 A1* | 10/2013 | Chiu | ................ | F16M 11/041 248/126 |
| 2015/0076299 A1* | 3/2015 | Yu | ................ | F16M 13/022 248/205.8 |
| 2015/0108134 A1* | 4/2015 | Fangyuan | ............ | F16M 13/022 220/483 |
| 2015/0306622 A1* | 10/2015 | Ashworth | ............ | A47K 5/1201 248/205.8 |
| 2016/0047494 A1* | 2/2016 | Dickinson | ........... | B60R 16/0215 248/74.2 |
| 2016/0068117 A1* | 3/2016 | Huelke | ................ | H01F 7/0252 24/303 |
| 2016/0215813 A1* | 7/2016 | Huang | ................ | F16B 47/006 |

* cited by examiner

*Primary Examiner* — Gary Hoge
(74) *Attorney, Agent, or Firm* — Geeta Kadambi; Riddhi IP LLC

(57) ABSTRACT

A magnetic surface mounting apparatus used for hanging items is described. The apparatus has several parts that can assemble and disassemble easily. The magnet housed in a magnetic case is surrounded by a boot. The boot is designed so the user can easily dislodge the magnet from the surface using the safety handle. The hanger is attached to the boot using the swivel pin. This apparatus can be used to hang working tools in a building or construction area or any area where several people use common tools and want ease of access and less clutter. It can be used in many sites and prevent health and safety hazards.

14 Claims, 14 Drawing Sheets

MAGNETIC SURFACE MOUNTING APPARATUS

CROSS REFERENCE TO RELATED PENDING APPLICATIONS

Figure 1:
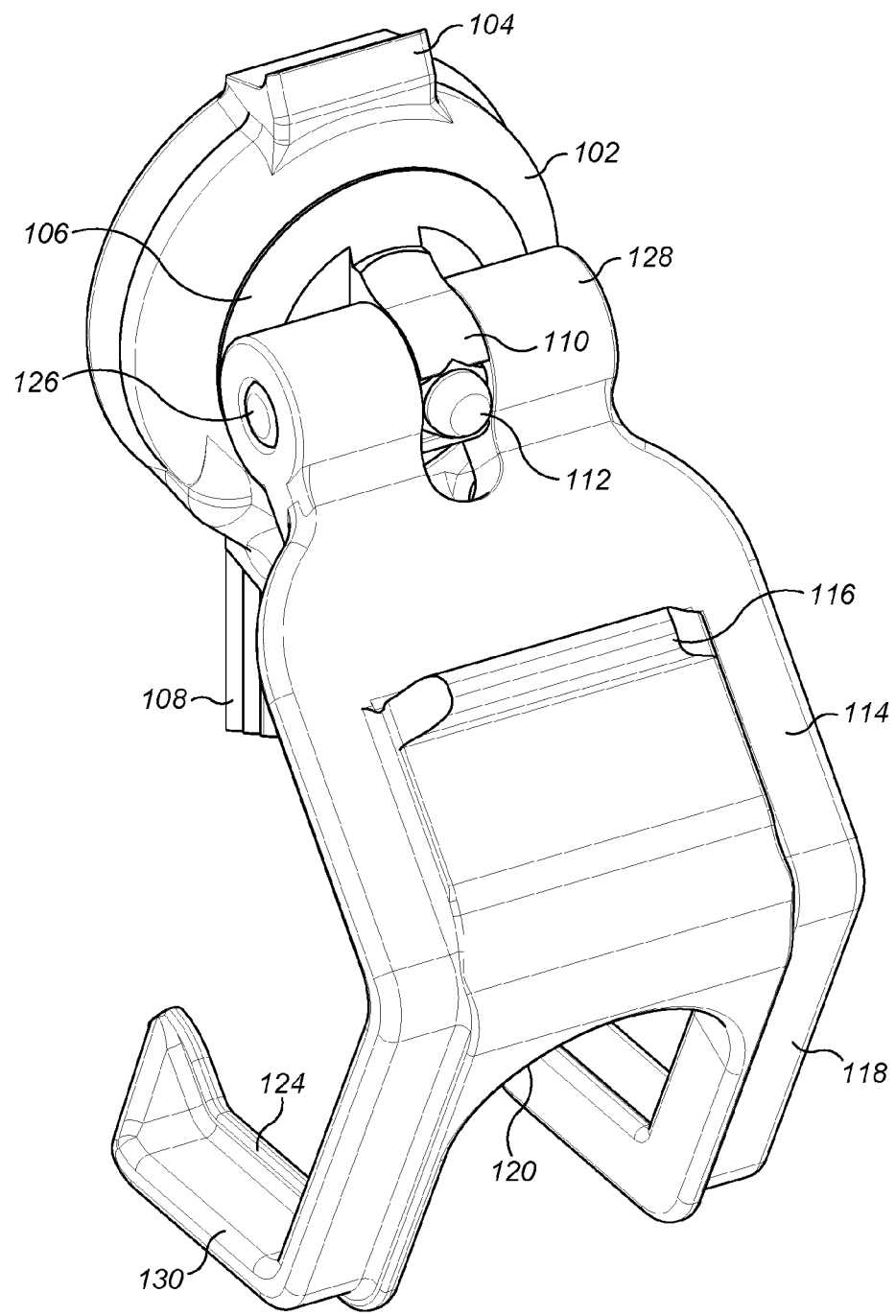

This application is a Utility application and claims priority to U.S. Provisional application Ser. No. 62/180,930, filed on 17 Jun. 2015. This application also claims priority to design applications 29/561,532 filed on 17 Apr. 2016 and 29/561,636 filed on 18 Apr. 2016. The application Ser. No. 62/180,930, 29/561,532 and 29/561,636 are hereby incorporated by reference in their entirety for all of their teachings.

FIELD OF TECHNOLOGY

This disclosure relates generally to a surface mounting apparatus (apparatus) that is used for hanging items on a ferrous containing surface using magnets. More particularly, it relates to an apparatus that is optimized and designed for used for surface mounting of items.

BACKGROUND

There are concerns of safety violations in the construction sites and they lead to statistically high numbers of "slip, trip and fall" incidences. During any operation, the tools related to the work include items like hoses, extension cords, wires, cables, buckets, ropes, hand held tools, devices and anything else that a person might trip over or slip on. In order to provide a solution for this, many people have designed products that are centered on moving these items to a safer place of use or storage. This makes it more cumbersome to reach for things and also to search for items. Making things readily available to a person who might need to reach out and grab it in a hurry would be a convenience.

Storage solution at home usually results in either building cabinets or using rental storage areas for articles that are being used occasionally and would be useful to have a solution that is safe and structurally sound to be used for hanging things like bicycles, extra suitcases, fire hoses, camping gears etc.

There is a need for a handy solution to hang instruments, tools and other important safety tools for a health and safety related needs in a busy work place and also for ergonomic use at home and work.

SUMMARY

Several embodiments for a magnetic surface mounting apparatus (apparatus) and method for using the same to perform a vertical hang function by optimizing length and width of the apparatus and magnetic strength are being disclosed.

In one embodiment, a magnetic surface mounting apparatus comprises of a boot, a swivel hinge, a pin and a hook. The apparatus has at least one magnet disposed inside the boot. The magnet can be adapted to form a magnetic attraction between the magnet and the ferrous material of the surface wherein the magnetic surface mounting apparatus is going to be attached. The boot can be mounted such that it can be installed and removed without the use of tools or fasteners. As well as provide a leverage bumper, safety handle, cleanable surface and creates friction to prevent slipping or sliding.

In one embodiment, a magnetic surface mount apparatus as a system is made by calculating the correct angles to design the hanger and magnetic strength is disclosed. In another embodiment, the magnetic surface mount comprises of a boot, a magnet case, a magnet, a pin and a hanger. The boot is designed in such a manner as to assist when necessary the removal of the magnet by assisting in the disruption of the magnetic field (attraction, allowing one side of the magnet to lift and release entirely and easily) holding in the magnetic to the mating surface.

In one embodiment, the hanger has a base and the base has several planar surfaces in form in "U" form and/or "L" form is disclosed. The back planar surface of the hanger has a specific angle to rest on the flat surface where the magnet is attached and has means to receive the swivel pin to attach it via a screw through the magnet that is attached to the boot. More particularly, it relates to an apparatus that is optimized and designed for use for vertical hanging and wall mounting of items using magnets or any angled surface as it may oppose the desired force for holding items, such as space in an antigravity state or under water.

In one embodiment, the second forked surface is designed to receive the object that needs to be hanged. In another embodiment, the second forked surface has an indentation or a cavity having a specific design to receive the object and support the weight of the object that needs to be hung vertically from by the magnetic surface mounting apparatus.

In one embodiment, the system is developed using calculations to accommodate the design of the magnetic surface mount using the pull and slide factor (SP factor) and the weight (pull strength) of the magnet. The direct (pull)—or outward (pull) on the magnetic hanger (vertical hang) is the strongest, when placed on a wall or lateral surface (it slides down or falls off), a large portion of the hanging strength is lost in comparison to (pull). The system developed using calculations and testing makes the best attempt for equalizing the difference, current testing shows that the apparatus can achieve 50% of the (Pull) force while in the (Slide) lateral use mode. i.e. hanging from the ceiling it holds 70 lbs—but on the wall it holds 35 lbs (50%) on 0.125 inch thick steel. Even though the unit can hold more weight if the steel mounting surface is thicker than 0.125 inch the results are still relatively the same in relationship to each other at 50% with this design. Future designs and materials may be able to increase the percentage.

In one embodiment, the apparatus is coated with a non-conductive and flame retardant material. In another embodiment, the apparatus is used by leveraging the surface as a pivot point, the arm (back surface) will push in against the surface and pull out on the hook at the center of the magnet, perpendicularly from the surface, allowing a greater object supporting strength as mentioned above the leverage is pushing in on the pivot point as to (pull) outward on the magnetic center—thereby transferring (slide) into (pull).

The apparatus and system disclosed herein may be implemented by any means for achieving various aspects, and may be executed in a form of an independent apparatus or as part of another apparatus. Other features will be apparent from the accompanying drawings and from the detailed description that follows.

DETAILED DESCRIPTION

Several embodiment and description of the magnetic surface mounting apparatus are disclosed. Although the present embodiments have been described with reference to specific example embodiments, it will be evident that various modifications and changes may be made to these embodiments without departing from the broader spirit and scope of the various embodiments. This disclosure relates to an apparatus that is designed optimally to hang objects by placing the apparatus either vertically or horizontally on a metal surface. The apparatus is a magnetic surface mounting apparatus. The apparatus solves the issue of reducing clutter in work space by providing a secure hanging opportunity. It complies with health and safety issues for work space. The use of the apparatus enables easy access to urgent and immediate use objects such as equipment's, tools, tubes, fire extinguisher, ropes, cords etc., but not just limited to these. The object may also be used for anything that may help the individual when a slip, trip or fall may occur such as first aid kits, fire extinguishers, AED, or any other responsive device that may otherwise be located somewhere that is not reachable quickly. The apparatus is made up of nonconductive material, for example plastic, but is not just limited to this. The apparatus may be used as a standalone product or can be a part of a bigger apparatus. Another advantage of the instantly claimed apparatus is the ability to move the apparatus without leaving damage signs on the surface or requiring further complicated installation, as these can be quickly dislodged and re-positioned. More examples, but not limited to, since this product requires a metal surface, the locations that may be used are few and specific to steel such as structural parts pertaining to the actual building or house, appliances and equipment installed during or after construction, vehicles, temporary storage containers and scaffolds etc.

FIG. 1 shows a magnetic surface mounting apparatus in one embodiment, having four distinct parts. The four parts are a boot that encases a magnet case carrying a magnet, a multidirectional swivel, pin and a hanger. A magnetic surface mount apparatus, comprises of a boot 102 is made up of a water resistant material to enclose a magnet case, an upper small locking tab 104, a lower big locking tab 116, an angular spacer having a serrated surface, a ribbed surface 108 to be used as weight transfer point and a safety handle, a hollow center and a flexible lower hollow gripping area to remove the magnetic surface mount apparatus from a surface that a magnet to attach itself. The swivel pin 126 made of a steel material to be housed on a pivot point curved structure 128 of a hanger 100 having a center hole to house a screw 112 that secures the hanger to the magnet case. The safety handle has a ribbed surface and hollow sections that dimples when pressure is applied so it can be mounted and dismounted from the ferrous containing surface without too much pressure being applied by the user. The boot has an upper small locking tab 104, a lower big locking tab 116 in it to support different configurations of the magnetic surface mounting apparatus. The surface is at least one of a flat surface. However, the boot is designed to adapt to rounded surface, angular surface and other surfaces for mounting.

The magnet is enclosed in a magnet case 106 and housed inside the boot and secured by a screw 112 that fastens through the back of the magnet, then through the swivel disk 110 then into the swivel pin 126 and in the front is attached to a swivel pin 126. The magnet case is made up of material such as rubber or plastic or polycarbonate and has a diameter smaller than the boot 102. The magnet case has a swivel disc 110 that grips the swivel pin 126 and cradles the screw and nut 112 in the front. The swivel disc enables the hanger 118 to swivel up and down to configure in different configurations and provides a support to swivel pin to attach itself to the magnetic case. The center swivel pin is embedded and made up of stainless steel and can withstand weights up to 300 pounds. Some example of the magnet strength in the apparatus is shown below in Table 1.

TABLE 1

| Magnet strength: HOLDING CAPACITY TESTS | | | |
|---|---|---|---|
| SURFACE | PRODUCT | HORI-ZONTAL | VERTI-CAL |
| ⅛ inch ferrous steel, smooth painted surface | Large Hook | 71 pounds | 35 pounds/ 31.9 inverted |
| ¼ inch ferrous steel with textured paint | Small Hook | 39.1 pounds | 19 pounds |
| 1-inch ferrous steel unpainted | Large Hook | 103 pounds | 51 pounds |
| Cooled to 12 F. | Large Hook | no change | |

The hanger 118 having an angular shape to have a back surface 114 that is perpendicular to the surface that the magnet attached itself and a second forked surface 130 that is away from the surface that the magnet attached itself to hang an item from it. The forked surface has a ridge 124 to provide extra structural integrity and also non slip function for the objects that are attached to it. The second forked surface may have different inundations/curvatures 120 for different types of items. The second forked surface has inundation and has a wide fork and a narrow fork to accommodate different types of items to be hung from them. The hanger 118 is interchangeable but the manufacturer's instructions need to be followed for using it for heavy or light items as the magnetic strength may not support a specific item that is heavier than the magnetic surface mounting apparatus is designed for.

The hanger has a front weight transfer point to receive the lower big locking tab of the boot and a back transfer point to receive the upper small locking tab of the boot so it can be used as a weight transfer point and lock the apparatus while in use. Each part is designed to fit snuggly so that it can bear the weight of the object that needs the support and also easily removable from the surface. The size and configuration of the apparatus may be changed based on the desired angle of the pull, weight and the objects that it needs to hang. The material used may be any temperature resistant material and/or nonconductive materials. It may also be made of steel or any metal that can withstand the heavy duty weight of tools that needs to be hanged. The magnet strength and the metal type and size would vary according to the use.

Figure 2:
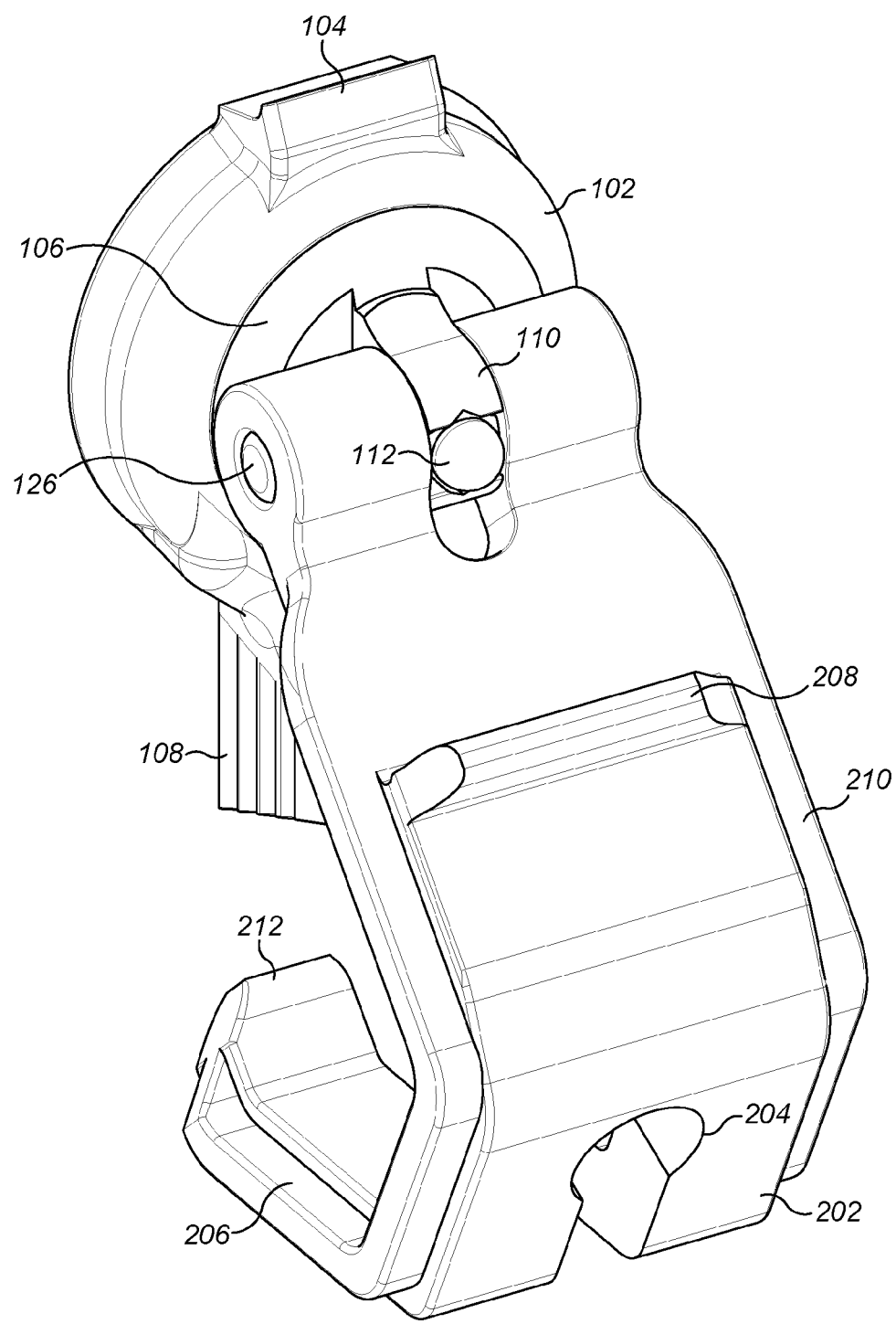

FIG. 2 shows a design for narrower type of hanger. The curvature for the hanger 202 is narrow 204. The forks 206 of the hanger is also wide and have a more pronounced curved surface 212 to hold smaller items and not allow them to slip out of the hanger hold. The angle of the hanger base in relation to the rubber boot and the swivel pin is mathematically calculated to optimize the slide and pull factor. A lower big locking tab 208 is also situated to secure the hanger to the small locking tab 104. The hanger 118 having an angular shape to have a back surface 114 and similar in design and function to the hanger 210 having an angular shape to have a back surface.

Figure 3:
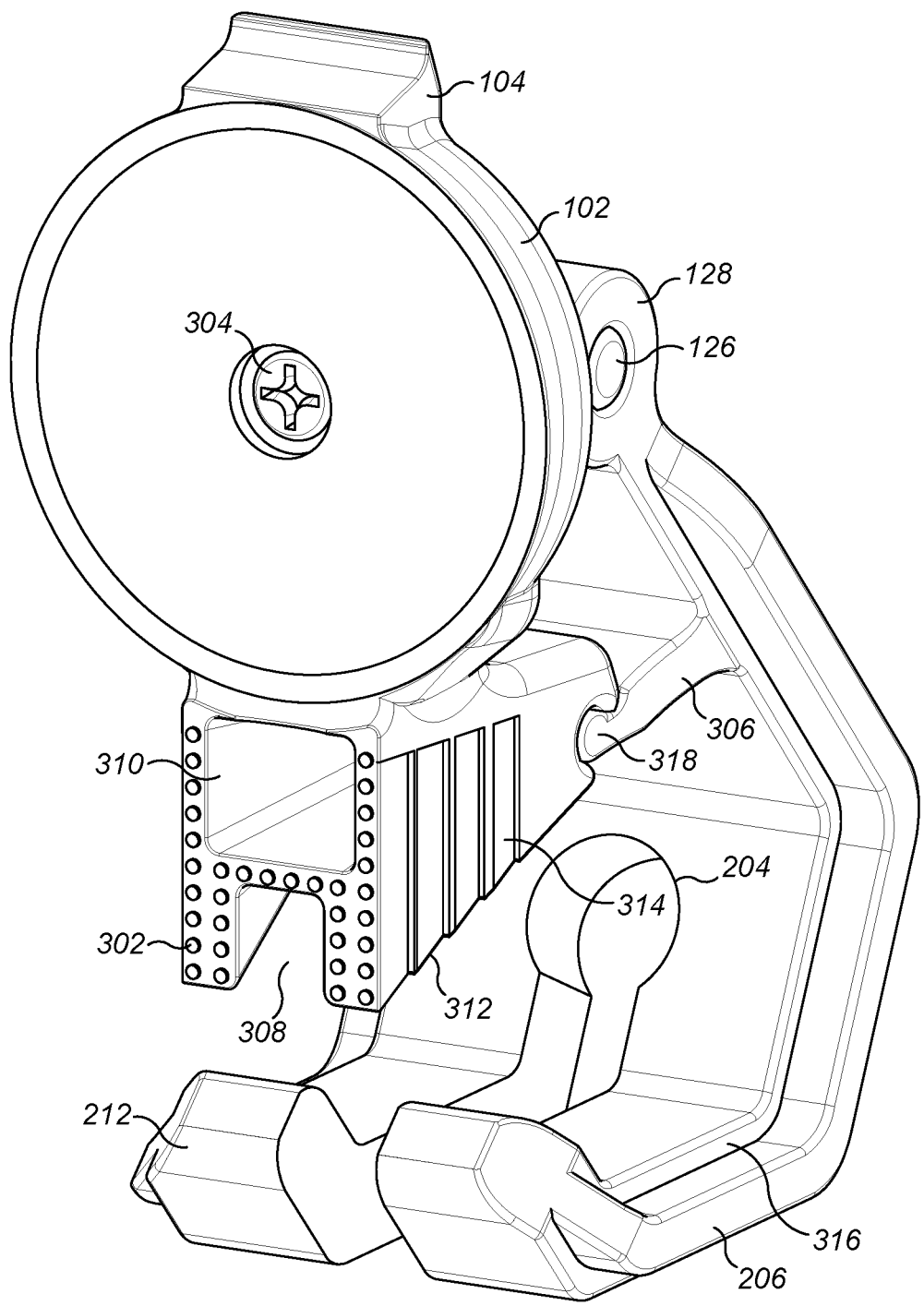

FIG. 3 shows the back view of the hanger; boot and the safety handle 312. The boot 102, swivel pin 126 and pivot point curved structure 128 of a hanger is secured by a screw and the head of the screw 304 is housed in the boot. The safety handle 312 has a unique function. It not only provides support to the boot while it is flushed with the surface but also helps the user to mount and dismount the magnetic surface hanging apparatus. It is a continuous part of the boot and may be molded and made together. It has two hollow chambers to provide ergonomic grip. The first hollow chamber 310 is within the safety handle and provides structural integrity and uniform thickness to the safety handle. The second hollow chamber 308 is open in the bottom to provide flexibility to the safety handle and to create an easily manufactured mould release as well as reduce materials used so that the user can easily grip to narrow the second hollow chamber to dislodge or move the magnetic surface mount apparatus. The lateral sides of the safety handle 312 are conical in shape and have ribbed surfaces 314 (108 as well). This ribbed structure provides the structure for non-slip grip and also adds to the structural strength of the safety handle. The safety handle has a dimpled surface 302 that is flushed with the back of the boot and it attaches itself to the surface. This dimpled surface and the safety handle works together as a weight transfer point and the dimpled surface provides additional friction. FIG. 3 also shows that the lower big locking tab 306 is securely fastened at 318 to complete the locking of the boot to the hanger. The extra ridge 316 like structure on the hanger fork as shown provides extra strength for the fork to hold the item that is being hung on the apparatus. The extra ridge is the secondary locking bar for when the unit is used in a different configuration and doubles as a mounting bar for the print plate accessory. There are many items that can be used for hanging with this apparatus for example, but not limited to, hats, tubes, fire hoses, tools, fire extinguishers, lights, garden hoses, bicycles etc.

Figure 4:
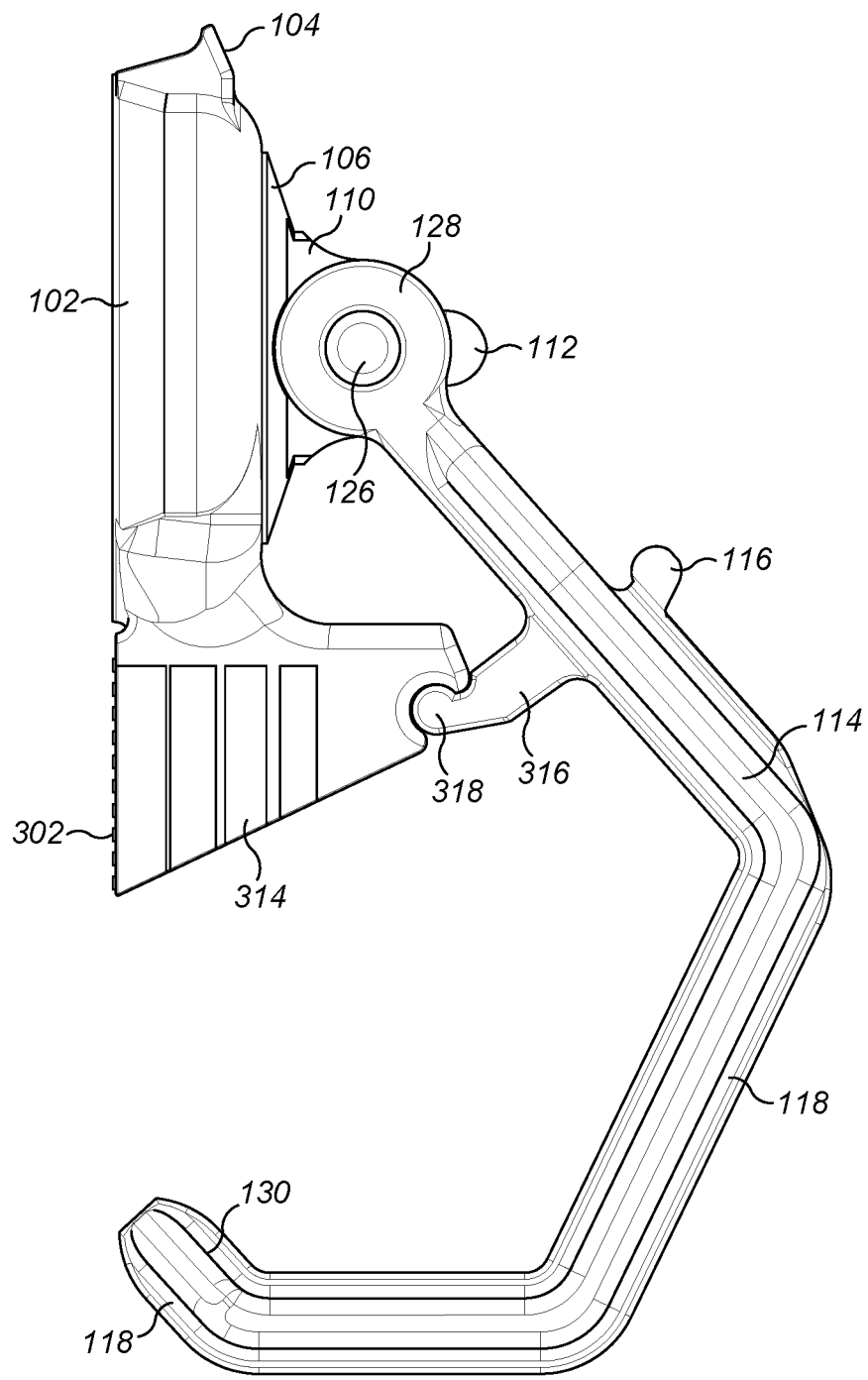

FIG. 4 shows a side view of the apparatus. The boot 102 is secure with the hanger 118 at point 318. The safety handle 314 (also used as thumb grip and weight transfer point) and the dimpled surface 302 are flushed with the surface. All other parts have been described in FIG. 1, FIG. 2 and FIG. 3 in detail.

Figure 5B:
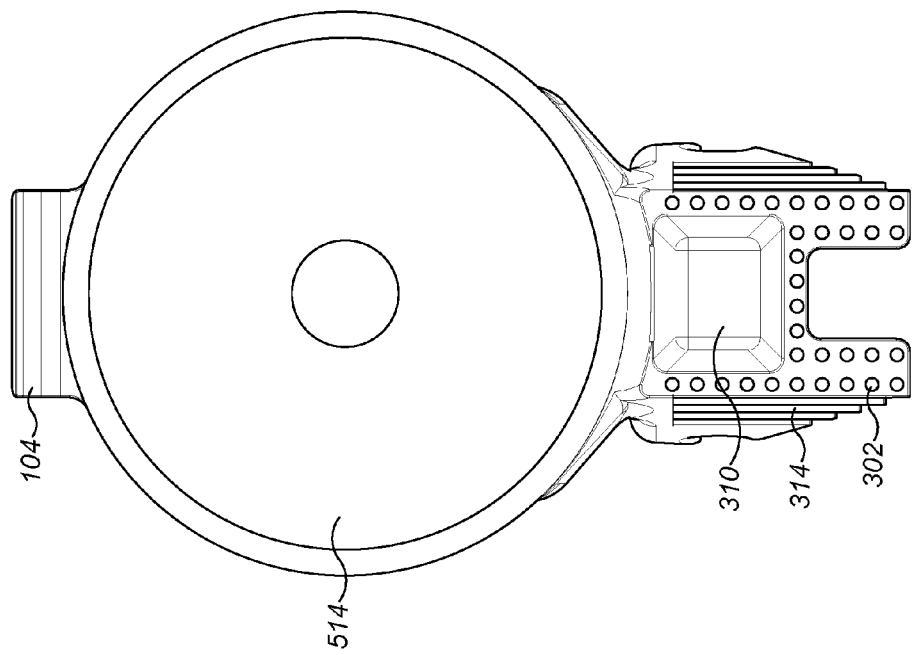
Figure 5A:
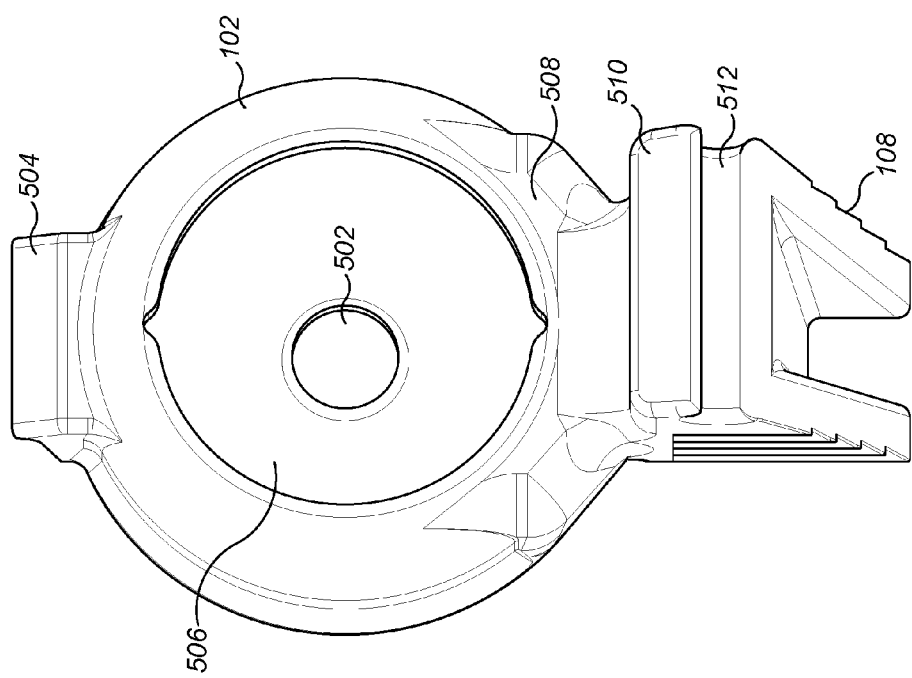

FIG. 5A shows the front view of the boot. The boot is a single piece non-conductive material cover piece to house a magnetic case containing a magnet. The center housing unit 506 is depressed and lower than the case 102. The housing unit 506 is hollow and has a hole 502 in the middle to accommodate the screw and screw head to secure the magnet. The upper part 504 is flush with the surface and provides strength to the upper small locking tab 104. The lower part 508 supports the lower big locking tab 510 and the groove 512 along with the safety handle 314. This is made up materials such as rubber or other non-conductive materials. FIG. 5B shows the back view of the boot. The back surface 514 is flush to the surface where it is going to attached itself. The hollow chamber 310 is shown and the ribbed edges 314 and dimpled surface 302. All these parts are one piece and this way they provide the structural integrity to the attachment portion of the apparatus.

Figure 6A:
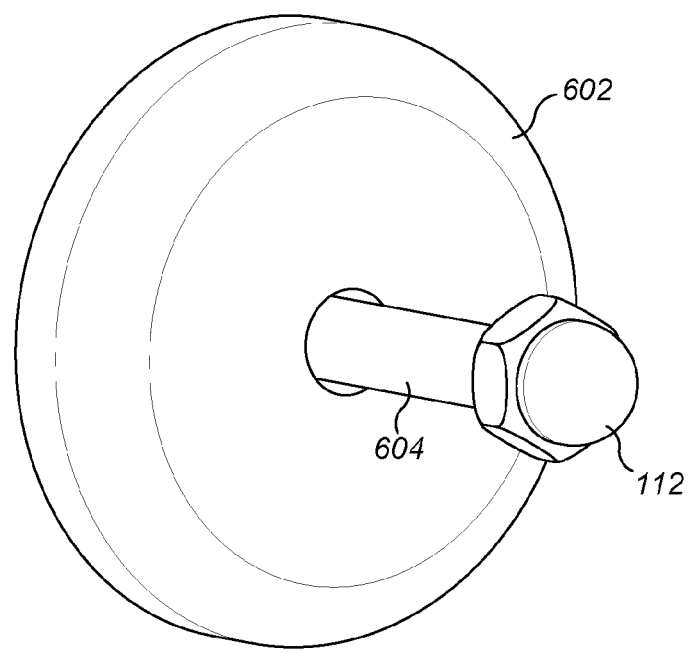

FIGS. 6A and 6B show the front and back of the magnetic case and their attachment screw. FIG. 6A shows the magnetic case 602 that contains the magnet of a specific strength and is completely sealed. The steel screw 604 travels through the hole of the magnetic case and secures itself to the boot and the bolt 112. FIG. 6B shows a bit more detail of securing the magnetic case with screw head 304, the body of the screw 604 and the nut 112.

Figure 7B:
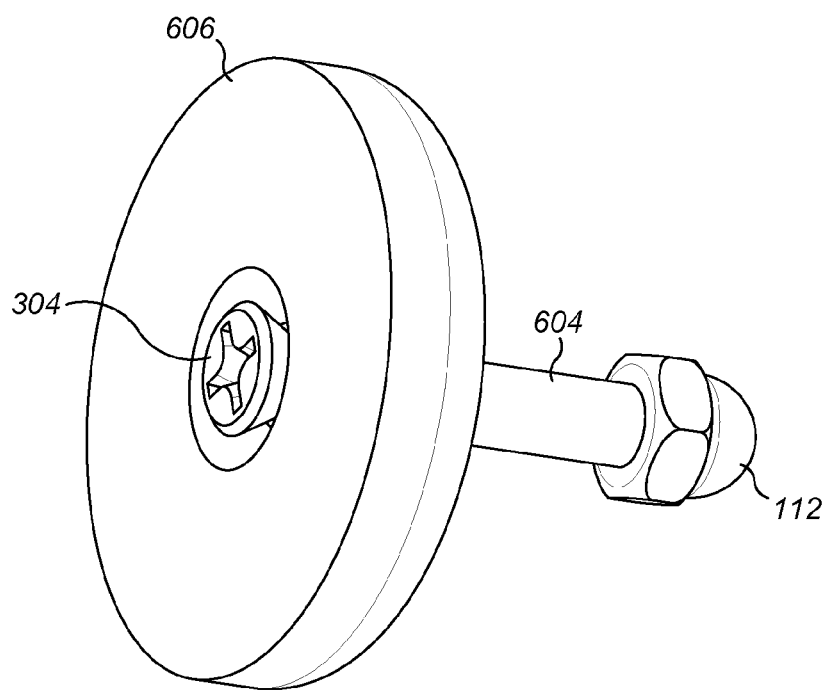
Figure 7A:
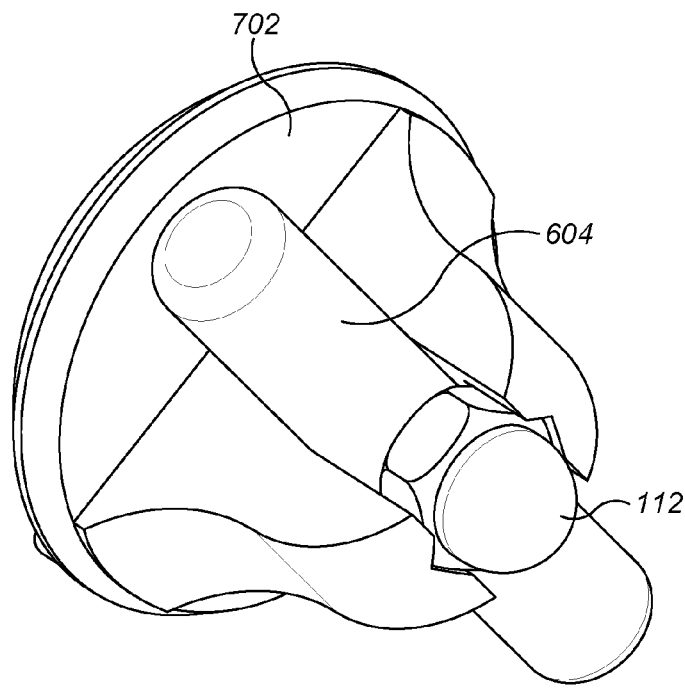
Figure 7B:
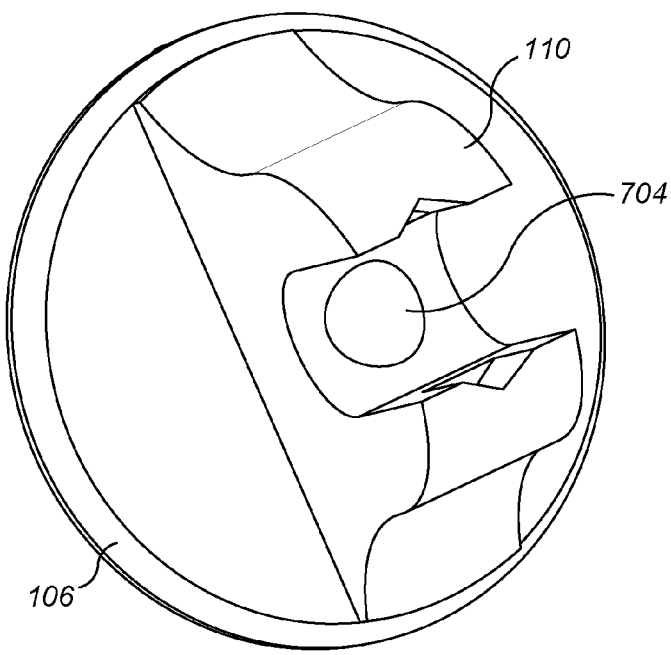

FIG. 7A shows the assembled swivel disc 110 with swivel pin 126. The back support 702 makes this structure easy for movement and also allows it to sit inside the boot housing unit 506. Since this is also a one piece moulded part the swiveling action is smooth and creates less friction for the magnetic case and the boot. FIG. 7B shows the swivel disc without the swivel pin and screw head so we can see the center 704 that allows the screw to travel through the swivel disc and to the back of the boot to secure the magnet.

Figure 8:
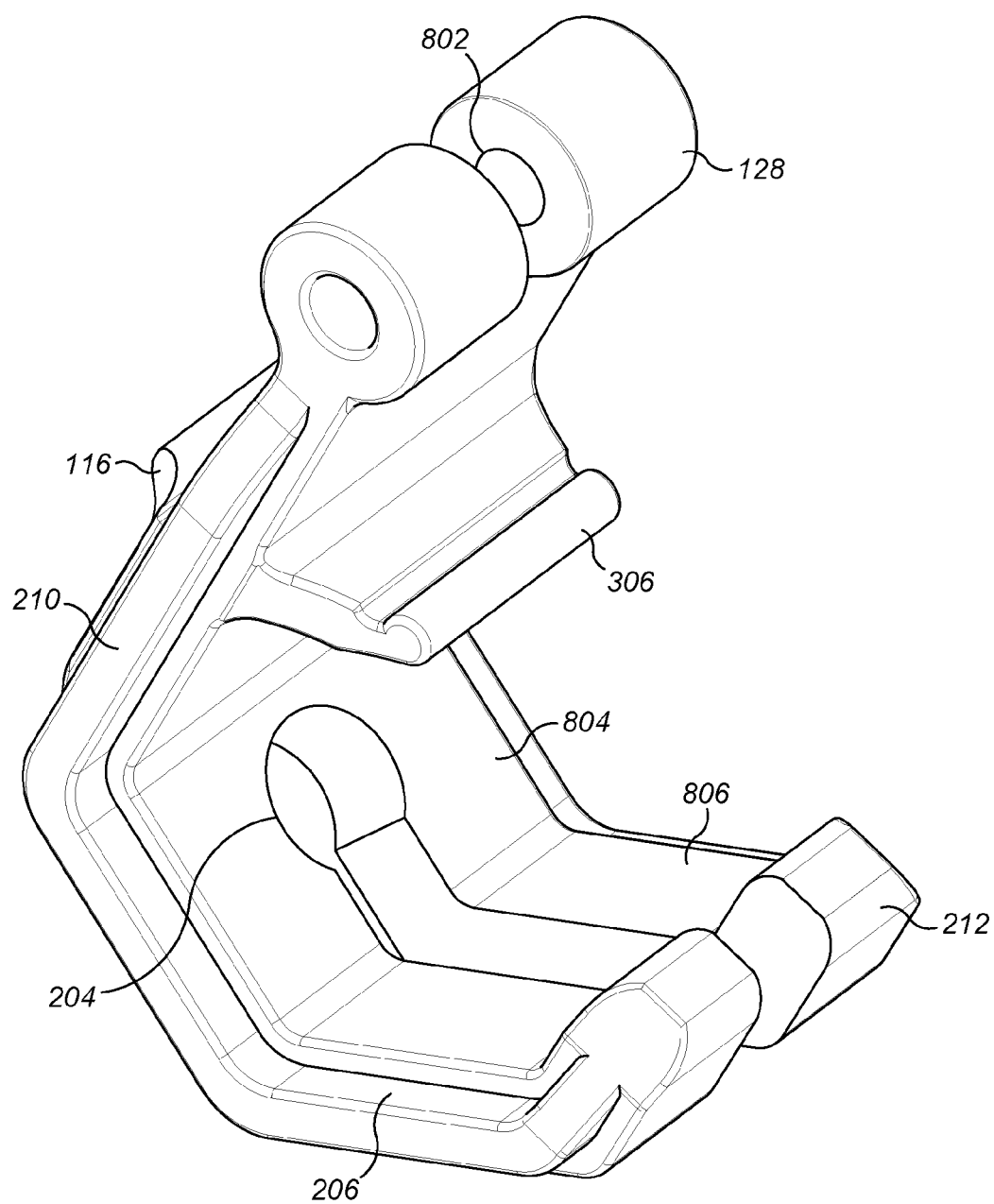

FIG. 8 shows the wide fork design for the hanger to be joined with the boot. The pivot point 128 has an aperture 802 for the pin to pass through. This hanger is also made as one piece for creating structural integrity and designed in such a way that weight bearing is calculated well and the apparatus does not break away from the boot. The hanger that has a wide fork has a specific angular design with three curved turns. The first turn 210 allows it to join with the boot as a certain angle and keeps the hanger away from the surface of connection in one position. The second fold of the curved design 804 actually separates it from the surface and allows a groove for the items to be housed. The third part 806 actually holds the items and secures it from falling off. The slight raise 212 further secures and not let any item slip out of the hanger while hanging vertically. The groove 204 also allows the item to be extra secure by allowing the user to further tuck a small portion in that part so it would not come loose. For example if a garden hose or an electrical cord is hanging from the hanger and apparatus the user may decide to tuck the nozzle, socket, plug in there so the garden hose does not come loose. The groove also allows the use of cords, lanyards, zip ties and also secondary hooks and fasteners for the user to customize their use.

Figure 9:
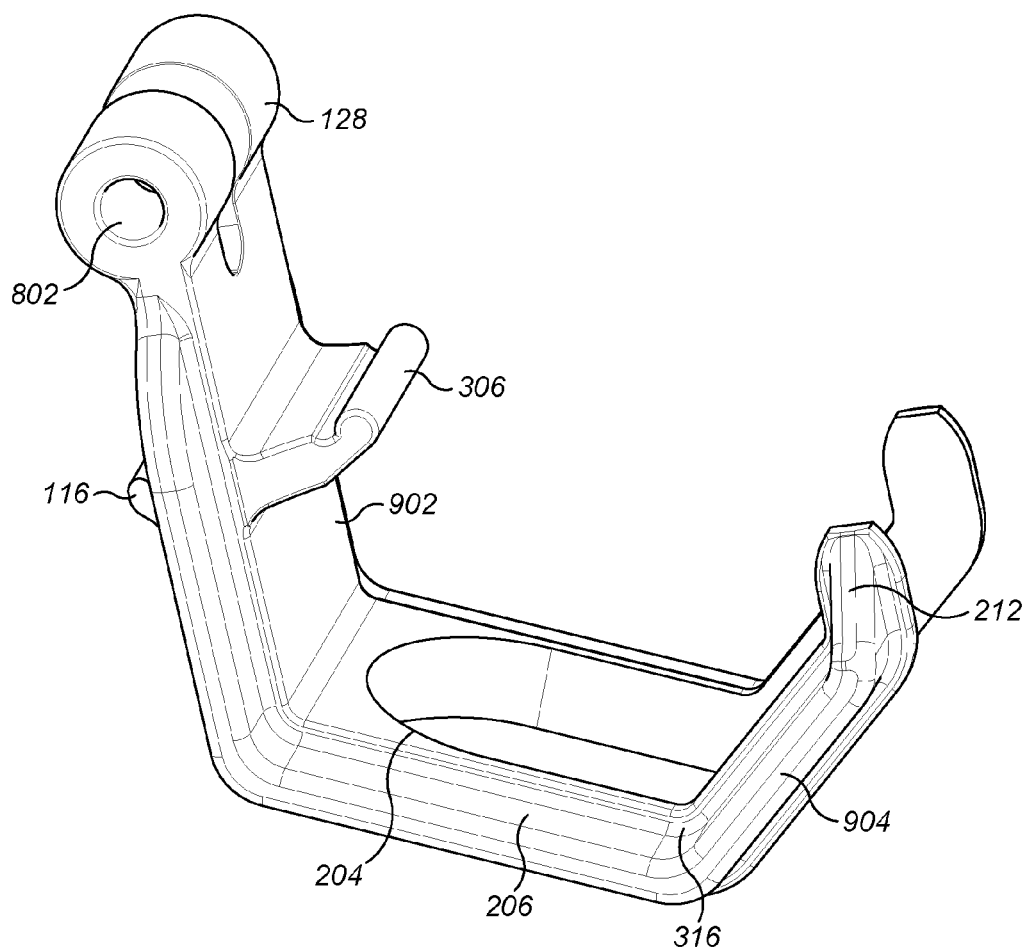

FIG. 9 shows a wide fork design for the hanger. The back portion of the hook 902 is wider so that it can bear the weight of the article or item better. The thickened ribs 904 and 316 give strength to keep the item in place and prevent falling off. Both the designs for forks have the same locking mechanism and fit to the same boot and are interchangeable with other boots.

Figure 10:
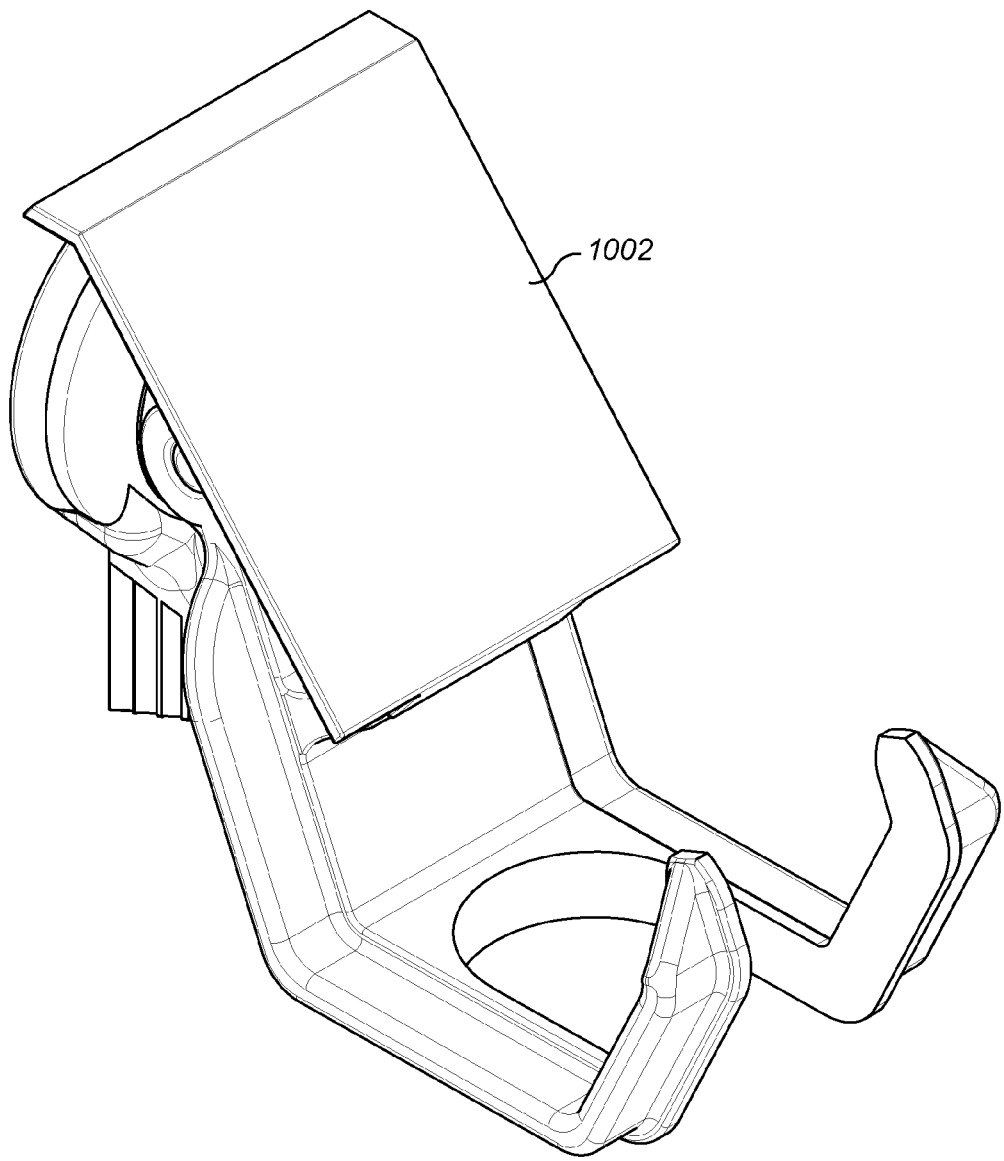

FIG. 10 shows that a plate 1002 may be attached to the apparatus. The plate 1002 is made up of materials that glow in dark or illuminate once it is dark. This may be used for several purposes. For example to label the equipment, print directions, identify the position and direct routes. One may have electronics mounted so the authorities may identify which equipment's are working or have a maintenance schedule monitored. It may also provide directions for people to use the equipment to the item in case of emergency. In the case of sensitive, medical or civilian storage facilities the unit can be inspected and labelled with hazardous materials, last inspection, temporary status etc.

Figure 11:
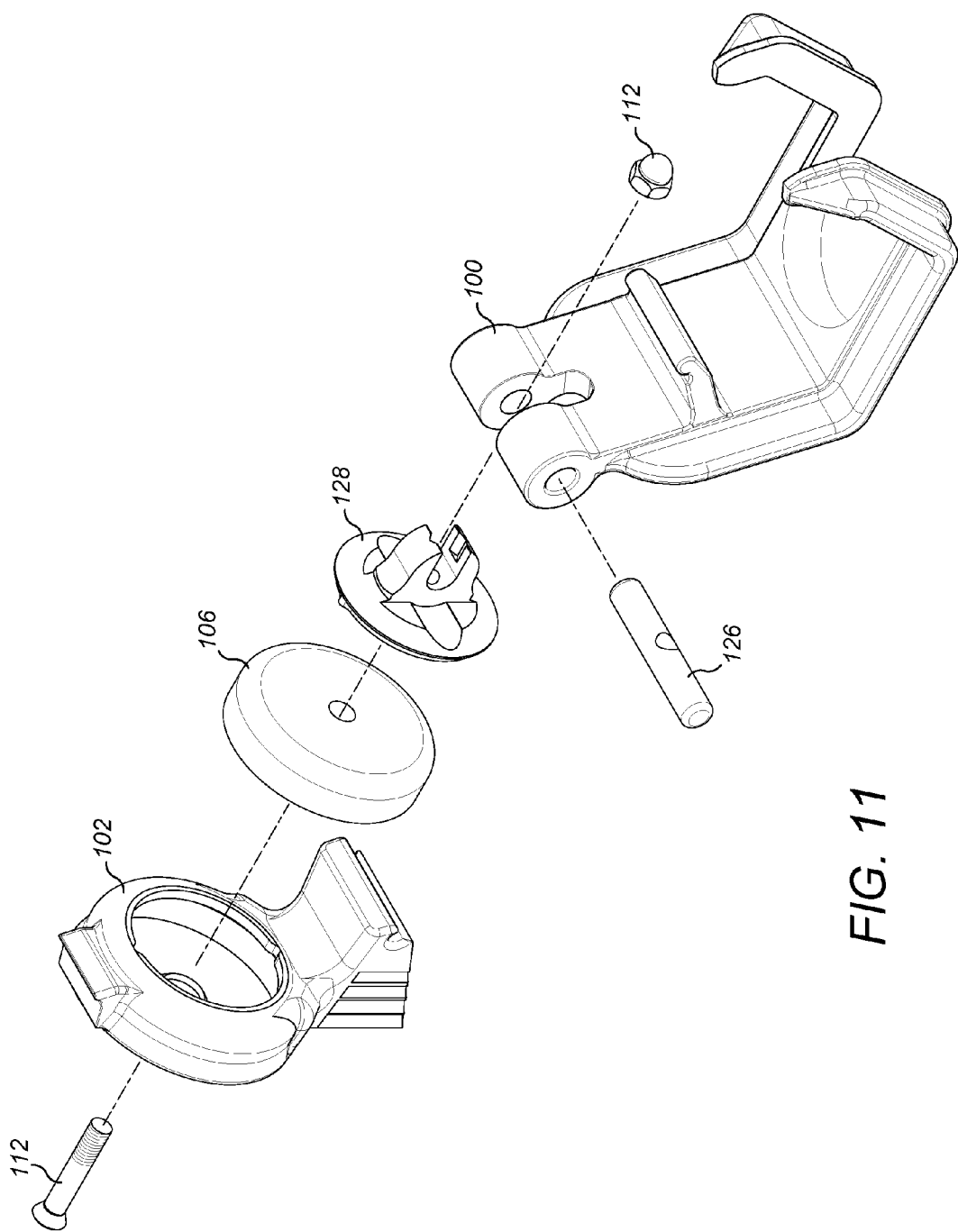
Figure 12:
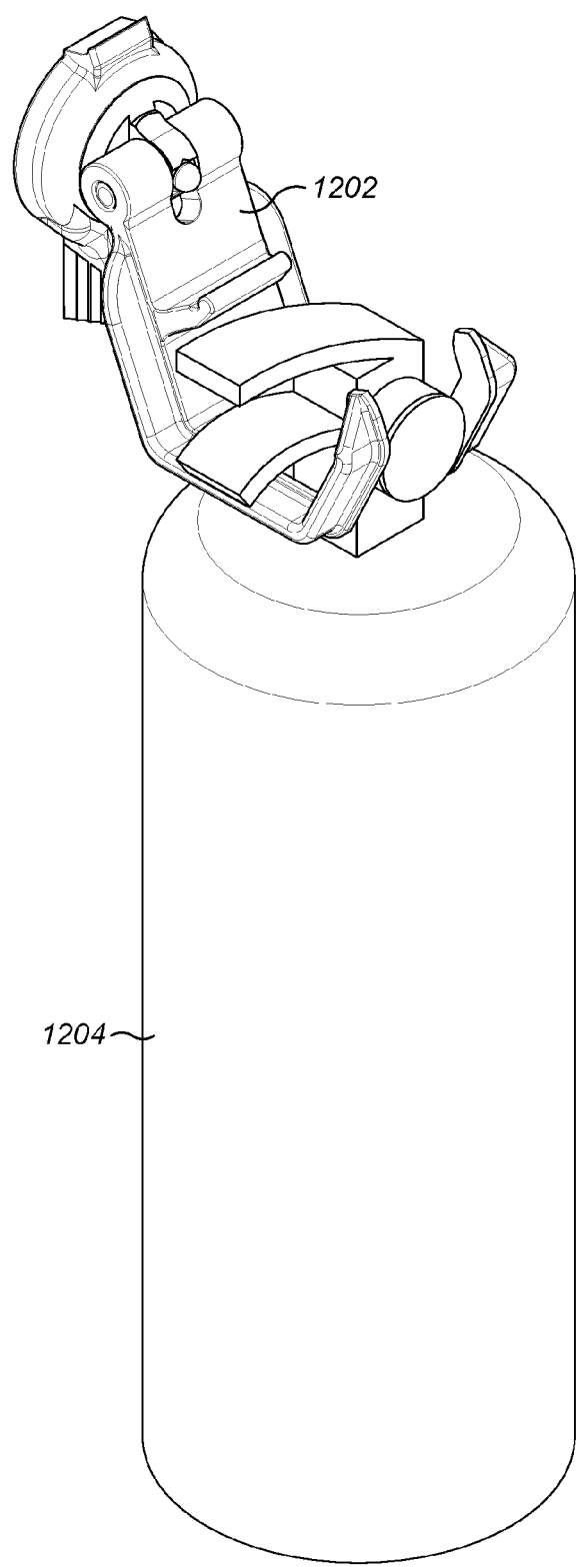
Figure 13:
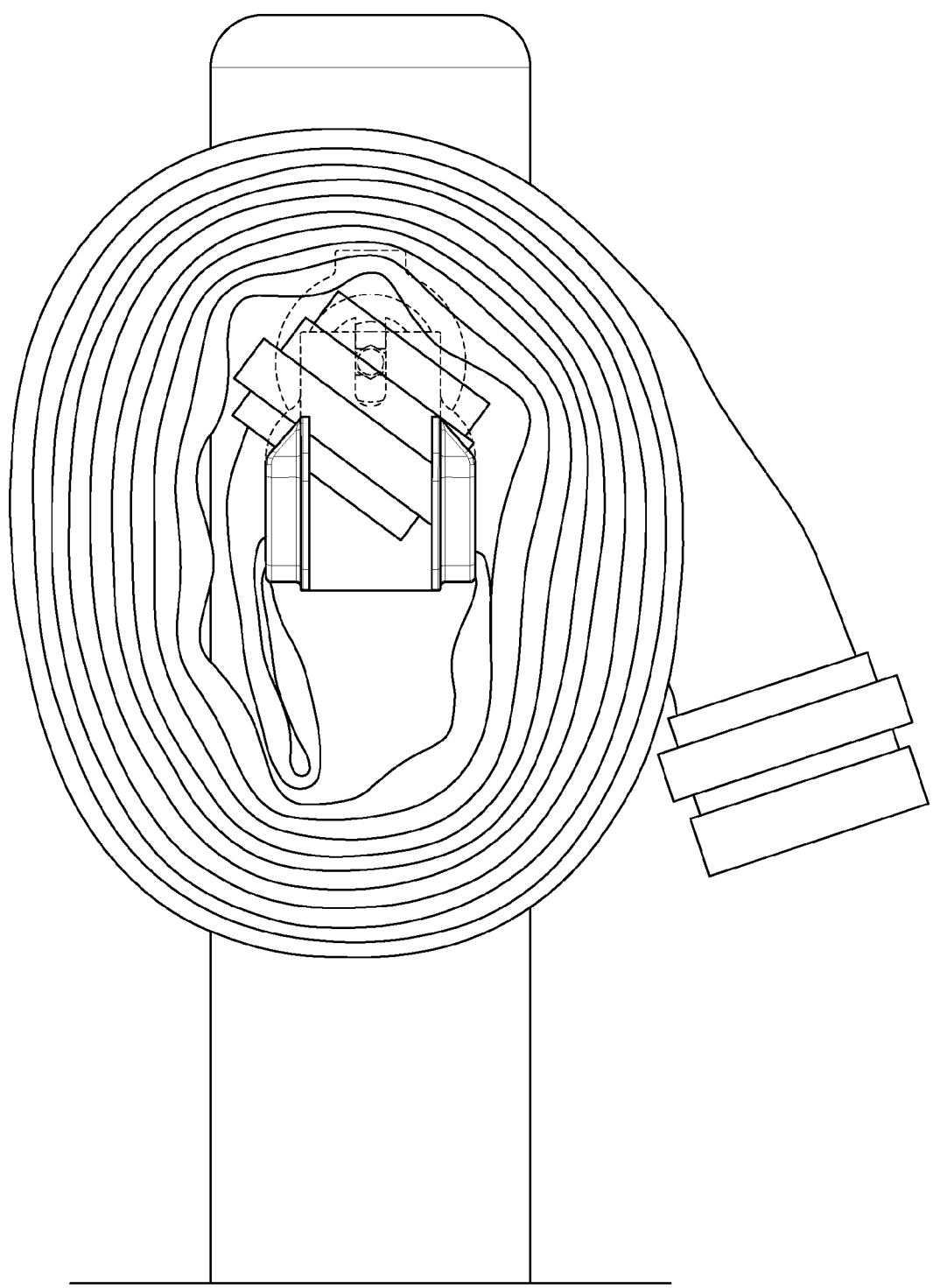
Figure 14:
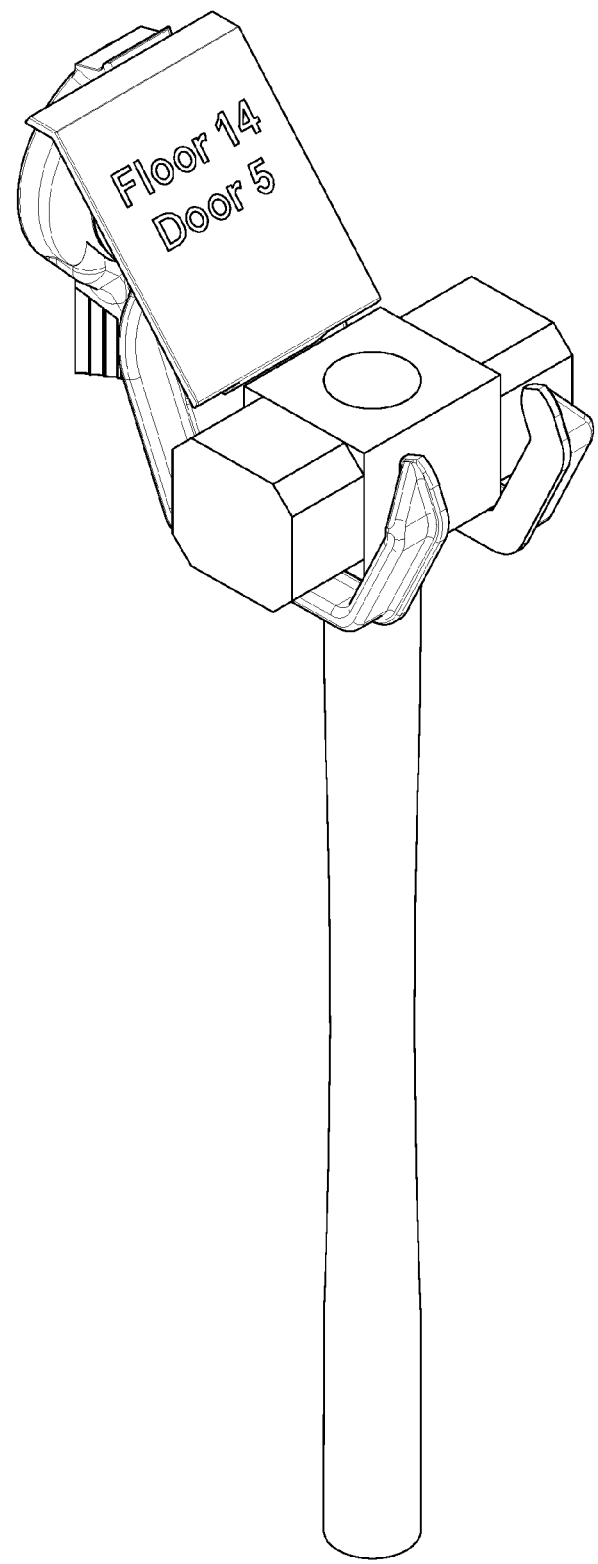

FIG. 11 shows how all the parts are assembled together to make this a seamless piece of apparatus. Minimum amount of moving part and joints make this a strong apparatus to be used in construction industry and heavy duty tool hanging spaces. The screw is inserted into the boot hole, magnetic housing with a magnet inserted into the bot, the swivel pin inserted into the boot and aligned to the hole of the pivot point of the hanger and a bolt is tightened to get all these parts together. To form a hanger. FIG. 12 shows an example of a fire extinguisher 1204 being hanged using the apparatus 1202. FIG. 13 shows a garden hose 1302 being hung by it. FIG. 14 shows a tool 1402 hanging from the hanger.

In addition, it will be appreciated that the various types of apparatus and system calculation to make it has been disclosed. Accordingly, the specification and drawings are to be regarded in an illustrative rather than a restrictive sense.

What is claimed is:
1. A magnetic surface mount apparatus, comprising:
   a boot is made up of a non-conductive material to enclose a magnet case, an upper small locking tab, a lower big locking tab, an angular spacer having a serrated surface, a ribbed surface to be used as a safety handle, a hollow center and a flexible lower hollow gripping area to remove the magnetic surface mount apparatus from a surface that a magnet can attach itself;

the magnet case to enclose the magnet and housed on to the boot and secured by a screw that fastens to the back of the boot and in the front is attached to a swivel pin;

the swivel pin made of a stainless steel material to be housed on a pivot point curved structure of a hanger having a center hole to house a screw that secures the magnet via a bolt through the magnet that is attached to the boot; and the hanger having an angular shape to have a back surface that is perpendicular to the surface that the magnet attached itself and a second forked surface that is away from the surface that the magnet attached itself to hang an item from it.

2. The apparatus of claim 1, wherein the second forked surface has inundation and has a wide fork and a narrow fork to accommodate different types of items to be supported from them.

3. The apparatus of claim 1, further comprising:
the hanger having a front weight transfer point to receive the lower big locking tab of the boot and a back transfer point to receive the upper small locking tab of the boot so it can be used as a weight transfer point and lock the apparatus while in use.

4. The apparatus of claim 1, further comprising:
a data plate to be attached to the hanger made up of luminous material for displaying signs for guidance and identification of a place and the item.

5. The apparatus of claim 1, wherein the magnet case has a protrusion to house a head of the screw.

6. The apparatus of claim 1, wherein the magnet case is smaller in diameter than the boot and made up of low friction material for smooth operation.

7. The apparatus of claim 1, wherein the swivel pin can hold the weight up to 300 pounds.

8. The apparatus of claim 1, wherein the magnet can hold the item that weighs between 1-230 pounds.

9. A magnetic surface mount apparatus, comprising:
a boot is made up of a non-conductive material to enclose a magnet case, an upper small locking tab, a lower big locking tab, an angular spacer having a serrated surface, a ribbed surface to be used as a safety handle, a hollow center and a flexible lower hollow gripping area to remove the magnetic surface mount apparatus from a surface that a magnet enclosed in the magnet case to attach itself;

the magnet case to enclose the magnet and housed on to the boot and secured by a screw that fastens to the back of the boot and in the front is attached to a swivel pin;

the swivel pin made of a stainless steel material to be housed on a pivot point curved structure of a hanger having a center hole to house a screw that secures the magnet case to the boot;

the hanger having an angular shape made up of non-conductive material to have a back surface that is perpendicular to the surface that the magnet attached itself and a second forked surface that is away from the surface that the magnet attached itself having inundation to prevent the item from falling off; and the hanger having a front weight transfer point to receive and lock into the lower big locking tab of the boot in one orientation and a back transfer point to receive the upper small locking tab of the boot in another orientation so it can be used as a weight transfer point and lock the apparatus while in use.

10. The apparatus of claim 9, wherein the apparatus can be configured in several ways by rotating the hanger and locking it to the lower big locking tab and the upper small locking tab of the boot.

11. The apparatus of claim 9, wherein the item comprises of a tool, wire, extension cord, bicycles, and fire extinguisher.

12. A magnetic surface mount apparatus, comprising:
a boot enclosing a magnetic encasing enclosing a magnet, attached to a hanger by a steel pin, wherein the hanger has at least one of a wide fork and a narrow fork to hang an item wherein the boot is made up of a non-conductive material to enclose a magnet case, an upper small locking tab, a lower big locking tab, an angular spacer having a serrated surface, a ribbed surface to be used as a safety handle, a hollow center and a flexible lower hollow gripping area to remove the magnetic surface mount apparatus from a surface that a magnet enclosed in the magnet case to attach itself.

13. The apparatus of claim 12, further comprising:
the hanger having a front weight transfer point to receive and lock into the lower big locking tab of the boot in one orientation and a back transfer point to receive the upper small locking tab of the boot in another orientation so it can be used as a weight transfer point and lock the apparatus while in use.

14. The apparatus of claim 13, further comprising:
a swivel pin made of a stainless steel material to be housed on a pivot point curved structure of the hanger having a center hole to house a screw that secures the magnet case to the boot.

* * * * *